(12) United States Patent
Karagoulis et al.

(10) Patent No.: US 9,908,199 B2
(45) Date of Patent: Mar. 6, 2018

(54) PROGRAMMABLE POLARITY MODULE FOR DC RESISTANCE SPOT WELDING

(71) Applicant: GM GLOBAL TECHNOLOGY OPERATIONS LLC, Detroit, MI (US)

(72) Inventors: Michael J. Karagoulis, Okemos, MI (US); David R. Sigler, Shelby Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 613 days.

(21) Appl. No.: 14/174,339

(22) Filed: Feb. 6, 2014

(65) Prior Publication Data

US 2014/0251961 A1 Sep. 11, 2014

Related U.S. Application Data

(60) Provisional application No. 61/774,227, filed on Mar. 7, 2013.

(51) Int. Cl.
*B23K 11/24* (2006.01)
*B23K 11/11* (2006.01)

(52) U.S. Cl.
CPC .......... *B23K 11/241* (2013.01); *B23K 11/115* (2013.01)

(58) Field of Classification Search
CPC ..... B23K 11/241; B23K 11/115; B23K 11/24; B23K 11/3009; B23K 11/11; B23K 9/09
USPC ... 219/86.1, 87, 90, 91.1, 137 PS, 116, 91.2, 219/501, 505
See application file for complete search history.

(56) References Cited

U.S. PATENT DOCUMENTS

| | | | | |
|---|---|---|---|---|
| 4,420,199 A * | 12/1983 | Vis | .......................... | H01R 39/10 219/89 |
| 4,503,316 A * | 3/1985 | Murase | .................... | B23K 9/06 219/130.32 |
| 4,564,742 A * | 1/1986 | Karlsson | .................. | B23K 9/06 219/130.1 |
| 4,910,375 A * | 3/1990 | Izume | ..................... | H02M 3/28 219/110 |
| 5,120,929 A * | 6/1992 | Kobayashi | ............. | B23K 11/24 219/110 |
| 5,570,254 A * | 10/1996 | Spilger | .................. | B23K 11/25 219/130.32 |
| 6,285,572 B1 * | 9/2001 | Onizuka | ................... | G05F 1/67 363/72 |

(Continued)

FOREIGN PATENT DOCUMENTS

| | | |
|---|---|---|
| CN | 102554440 A | 7/2012 |
| JP | S6240979 A | 2/1987 |
| JP | H081349 A | 1/1996 |

*Primary Examiner* — David Angwin
*Assistant Examiner* — Biniam Asmelash
(74) *Attorney, Agent, or Firm* — Reising Ethington P.C.

(57) ABSTRACT

A programmable polarity module that permits rapid on-demand control of the polarities assigned to the welding electrodes retained on a welding gun is disclosed. The programmable polarity module is electrically connectable to the welding gun and a direct current power supply unit to provide direct current to the welding electrodes for exchange during spot welding. A first interchangeable polarity output lug and a second interchangeable polarity output lug of the programmable polarity module permit the polarities of the welding electrodes to be switched without having to electrically disconnect the module from the welding gun.

13 Claims, 6 Drawing Sheets

(56) References Cited

U.S. PATENT DOCUMENTS

| | | |
|---|---|---|
| 6,861,609 B2 | 3/2005 | Sigler et al. |
| 7,041,936 B2 * | 5/2006 | Oberzaucher ........ B23K 9/0953 219/130.21 |
| 2008/0083705 A1 * | 4/2008 | Peters .................. B23K 9/1068 219/61 |

* cited by examiner

PROGRAMMABLE POLARITY MODULE FOR DC RESISTANCE SPOT WELDING

This application claims the benefit of U.S. provisional patent application No. 61/774,227, filed on Mar. 7, 2013, the entire contents of which are hereby incorporated by reference.

TECHNICAL FIELD

The technical field of this disclosure relates generally to a programmable polarity module that can be connected to a direct current ("DC") power supply for a resistance spot welding gun. The programmable polarity module allows the polarity of the welding gun's electrodes to be controlled, as needed, to best accommodate the resistance spot welding process being practiced at the time.

BACKGROUND

Resistance spot welding is a process used by a number of industries to join together two or more metal workpieces. The automotive industry, for example, often uses resistance spot welding to join together pre-fabricated sheet metal workpieces during the manufacture of a vehicle door, hood, trunk lid, or lift gate, among others. A number of spot welds are typically formed along a peripheral edge of the metal workpieces or some other bonding region to ensure the part is structurally sound. The most common metal workpieces used today in the automotive industry are those made of steel and an aluminum alloy. The desire to incorporate aluminum alloys into a vehicle has made it enviable to spot weld an aluminum alloy workpiece to another aluminum alloy workpiece or, alternatively, to a steel workpiece.

The resistance spot welding process is performed by an automated robotic or pedestal welding gun that includes two arms. Each of these arms holds a welding electrode typically comprised of a suitable copper alloy. The welding gun arms can be positioned on opposite sides of a workpiece stack-up and clamped to press the two electrodes against their respective metal workpieces at diametrically common spots. A momentary electrical current is then passed through the metal workpieces from one electrode to the other. Resistance to the flow of electrical current through the metal workpieces and their faying interface (i.e., the contacting interface of the metal workpieces) generates heat at the faying interface. This heat forms a molten weld pool which, upon stoppage of the current flow, solidifies into a weld nugget. After the spot weld is formed, the welding arms release their clamping force, and the spot welding process is repeated at another weld site.

The electric current that is passed between the opposed electrodes and through the metal workpieces is received from a DC power supply carried by the welding gun. The DC power supply may, for example, be a medium-frequency integrated transformer and rectifier package configured to deliver high DC amperage in accordance with a specified weld schedule. This type of DC power supply, and other similar types as well, furnishes the opposed electrodes with fixed opposite polarities when electrically connected to the welding gun; that is, after the DC power supply has been installed, one electrode is always the positive electrode and the other is always the negative electrode.

The polarity assigned to the welding electrodes is not inconsequential. It has been found, for instance, that a polarity bias exists when spot welding (1) an aluminum alloy workpiece to another aluminum alloy workpiece, and (2) an aluminum alloy workpiece to a steel workpiece. A less pronounced polarity bias also exists when spot welding a steel workpiece to another steel workpiece and in certain practices of projection welding. The ability to control which electrode has the positive/negative polarity while the welding gun and the DC power supply remain electrically connected—including the ability to switch electrode polarities at any time—would permit more operationally effective spot welding practices to be developed in at least these instances, and possibly others. Such electrode polarity control cannot be achieved with conventional DC power supplies. In fact, when a conventional DC power supply is employed, the only way to change the polarity of the electrodes is to physically disconnect the power supply from the welding gun, and then re-connect the power supply in reverse polarity orientation, which is a time-consuming and laborious process.

SUMMARY

A programmable polarity module that permits rapid on-demand control of the polarities assigned to the welding electrodes retained on a welding gun is disclosed. The programmable polarity module is electrically connectable to the fixed polarity output lugs of a DC power supply in any known fashion to provide a multi-component DC power supply unit. It is also electrically connectable to the welding gun, and thus the welding electrodes, by way of a first interchangeable polarity output lug and a second interchangeable polarity output lug. The first and second interchangeable polarity output lugs can assign either a positive polarity or a negative polarity to their associated welding electrodes.

Each of the first and second interchangeable polarity output lugs is associated with a pair of high-amperage silicon controlled rectifiers (SCR's). Within each pair of SCRs, one SCR is associated with a positive polarity and the other SCR is associated with a negative polarity. The pairs of SCR's can thus be controlled to assign each interchangeable output polarity lug—and the welding electrode associated with each lug—with a positive polarity or a negative polarity. This type of control permits the polarity designations of the two welding electrodes to be dictated in any conceivable way so that the particulars of a variety of spot welding processes can be accommodated. The polarity of each welding electrode can even be rapidly switched without having to disconnect the DC power supply from the welding gun.

The term "high-amperage silicon controlled rectifier" and its abbreviation, "SCR," as used herein, are meant to broadly encompass a single thyristor or an arrangement of one or more thyristors that act in tandem. Thyristors are electrical switching devices that include alternating p-type and n-type semiconductor layers that can be controlled to permit or block current flow based on the magnitude (or lack thereof) of a voltage applied to a control terminal (also known as a gate). The number of thyristors employed in each SCR depends on the magnitude of the current that needs to be managed through the first and second interchangeable polarity output lugs. For example, each SCR in the pairs of SCR's associated with the first and second interchangeable polarity output lugs may be a single thyristor or, if the current capacity of a single thyristor is not sufficient for whatever reason, an arrangement of several thyristors connected in parallel that, together, can accommodate the magnitude of the current that needs to be controlled.

The programmable polarity module can be used to cure the effects of an electrode polarity bias that exists within a resistance spot welding process. For example, when spot welding an aluminum alloy workpiece to another aluminum alloy workpiece with a pair of copper alloy electrodes, the current exchanged between the welding electrodes may create a heat differential at the electrode/workpiece interfaces due to the flow of electrons across the aluminum alloy-copper alloy junctions. Specifically, more heat may be generated at the positive welding electrode than at the negative welding electrode, which causes the positive welding electrode to wear at a faster rate. The programmable polarity module could be used here to switch the polarities of the two electrodes every so often, preferably after every spot weld, to keep one electrode from wearing faster than the other.

As another example, an electrode polarity bias may exist when spot welding dissimilar metal workpieces with a pair of copper alloy electrodes. The dissimilar metal workpieces may be a pair of aluminum alloy sheet metal layers of considerably different thicknesses, or an aluminum alloy sheet metal layer and an aluminum alloy casting, or an aluminum alloy workpiece and a steel workpiece, to name but a few. The spot welding of such dissimilar metal workpieces, like before, may create a heat imbalance at the electrode/workpiece interfaces in which more heat is generated at the positive welding electrode and less heat is generated at the negative welding electrode. Better quality spot welds can generally be achieved by using this heat differential to offset differences in the electrical conductivities and/or the melting points of the dissimilar metal workpieces. The programmable polarity module could be used here to ensure that the welding electrodes are assigned the polarity that results in the best weld quality.

DETAILED DESCRIPTION

Figure 1:
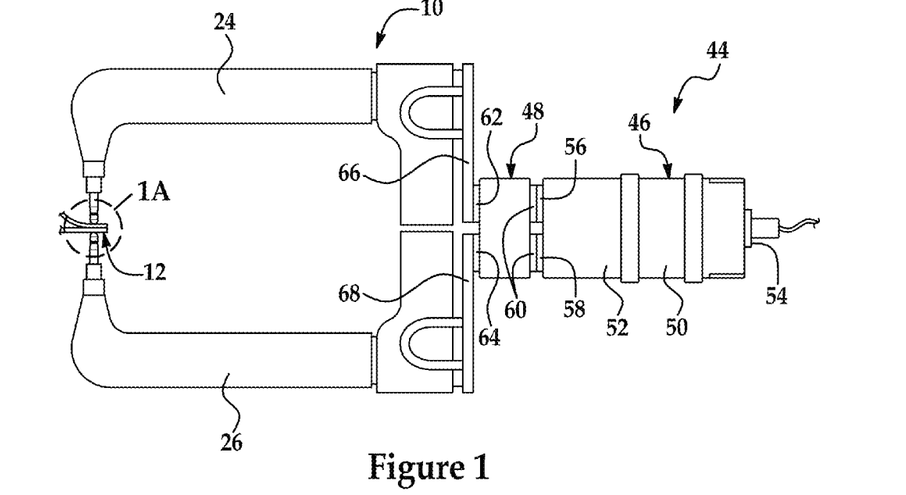
FIG. 1 is a generalized illustration of a welding gun for use in resistance spot welding applications.
Figure 1A:
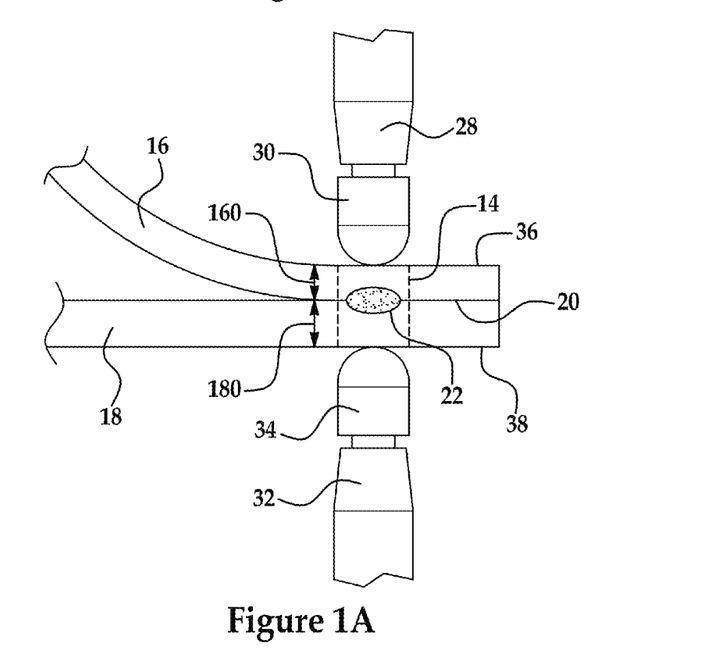
FIG. 1A is a magnified view of the encircled portion of FIG. 1 identified as 1A.

FIGS. 1-1A generally depict a welding gun 10 that can be used to resistance spot weld a metal workpiece stack-up 12 at one or more predetermined spot weld sites 14. The workpiece stack-up 12 includes, for example, a first metal workpiece 16 and a second metal workpiece 18. These metal workpieces 16, 18 overlap one another to provide a faying interface 20 at the weld site 14 where the spot welding process forms a weld nugget 22 that metallurgically joins the metal workpieces 16, 18 together. The term faying interface 20, as used herein, encompasses instances of direct overlapping contact between the workpieces 16, 18 as well as instances where the workpieces 16, 18 may not be touching, but are nonetheless overlapping in close proximity to one another, such as when a thin layer of adhesive, sealer, or some other intermediate material is present. Each of the first and second metal workpieces 14, 16 may have a thickness 160, 180 that ranges from about 0.3 mm to about 6.0 mm, and preferably ranges from about 0.6 mm to about 3.0 mm, at the weld site 14.

At least one of the first or second metal workpieces 16, 18 is composed of an aluminum alloy. The aluminum alloy may be an aluminum-magnesium alloy, an aluminum-silicon alloy, an aluminum-magnesium-silicon alloy, or an aluminum-zinc alloy. Some specific aluminum alloys of this kind are 5754 aluminum-magnesium alloy, 6022 aluminum-magnesium-silicon alloy, and 7003 aluminum-zinc alloy. The other of the first or second metal workpieces 16, 18 may be composed of an aluminum alloy, like the ones just mentioned, or it may be composed of steel. The steel may be a low carbon steel, a galvanized low carbon steel, or a galvanized advanced high strength steel (AHSS). Some specific steels of this kind include interstitial-free (IF) steel, dual-phase (DP) steel, transformation-induced plasticity (TRIP) steel, and press-hardened steel (PHS). The term "metal workpiece" and its aluminum alloy and steel variations are used broadly in the present disclosure to include a sheet metal layer, a casting, an extrusion, and other aluminum alloy or steel pieces that are resistance spot weldable.

It should be noted that the weld nugget 22 shown in FIG. 1A is a generic illustration that is meant to be representative of the wide variety of weld nugget compositions—and weld nugget locations—that can be formed at the faying interface 20 of first and second metal workpieces 16, 18. For example, if the first and second metal workpieces 16, 18 are aluminum alloy sheet metal layers, the weld nugget formed at the faying interface of the two layers will penetrate into each layer to some extent. A typical penetration depth of the weld nugget into each aluminum alloy sheet metal layer is about 10% to about 80% of the thickness of the layer. As another example, if the first metal workpiece 16 is a steel sheet metal layer and the second metal workpiece 18 is an aluminum alloy sheet metal layer, the weld nugget formed at the faying interface of the two layers will penetrate mainly into the aluminum alloy sheet metal layer, primarily because aluminum alloys melt at a significantly lower temperature than steel. The weld nugget 22 depicted in FIG. 1A is thus intended to represent a more inclusive variety of weld nugget and weld nugget locations than what is generically shown, including the specific examples described here as well as any others that may be formed between the different combinations of workpiece materials that can be employed.

The welding gun 10 includes a first gun arm 24 and a second gun arm 26. The first gun arm 24 includes a shank 28 that retains a first welding electrode 30. Likewise, the second gun arm 26 includes a shank 32 that retains a second welding electrode 34. The first and second gun arms 24, 26 may be stationary (pedestal welder) or robotically moveable, as is customary in the art, and are operated during spot welding to press the first and second welding electrodes 30, 34 against oppositely-facing surfaces 36, 38 of the first and second metal workpieces 16, 18 in diametric alignment with one another at the weld site 14. The clamping force assessed by the gun arms 24, 26 establishes good mechanical and electrical contact between the welding electrodes 30, 34 and their respective engaged metal workpiece surfaces 36, 38.

Figure 2:
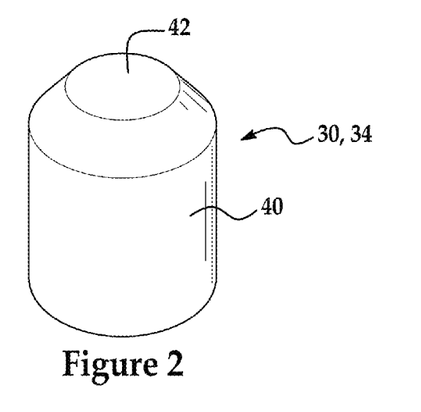
FIG. 2 is a generalized illustration of a welding electrode that can be used to perform resistance spot welding.

The first and second welding electrodes 30, 34 are preferably water-cooled copper alloy welding electrodes that include a body 40 and a weld face 42 at the end of the body 40, as illustrated in FIG. 2. The weld face 42 is the part of the electrode that contacts the surface 36, 38 of the metal workpiece 16, 18 being engaged by the electrode 30, 34. And it may incorporate any of a wide variety of designs that are suitable for spot welding an aluminum alloy workpiece or a steel workpiece. If the welding electrode 30, 34 is intended to engage an aluminum alloy workpiece, for example, the weld face 42 is preferably domed, as shown in FIG. 2, and may further be smooth, textured, or include surface features such as protruding ringed ridges. Some examples of these types of copper alloy welding electrodes are described in U.S. Pat. Nos. 6,861,609, 8,222,560, 8,274,010, and 8,436,269, and U.S. Patent Application Publication No. 2009/0255908. If the welding electrode 30, 34 is intended to engage a steel workpiece, the weld face 42 is preferably flat or domed as has long been known in the art. An electrode weld face design that may be used to weld both aluminum alloy and steel workpieces is described in U.S. Pat. No. 8,525,066.

Figure 3:
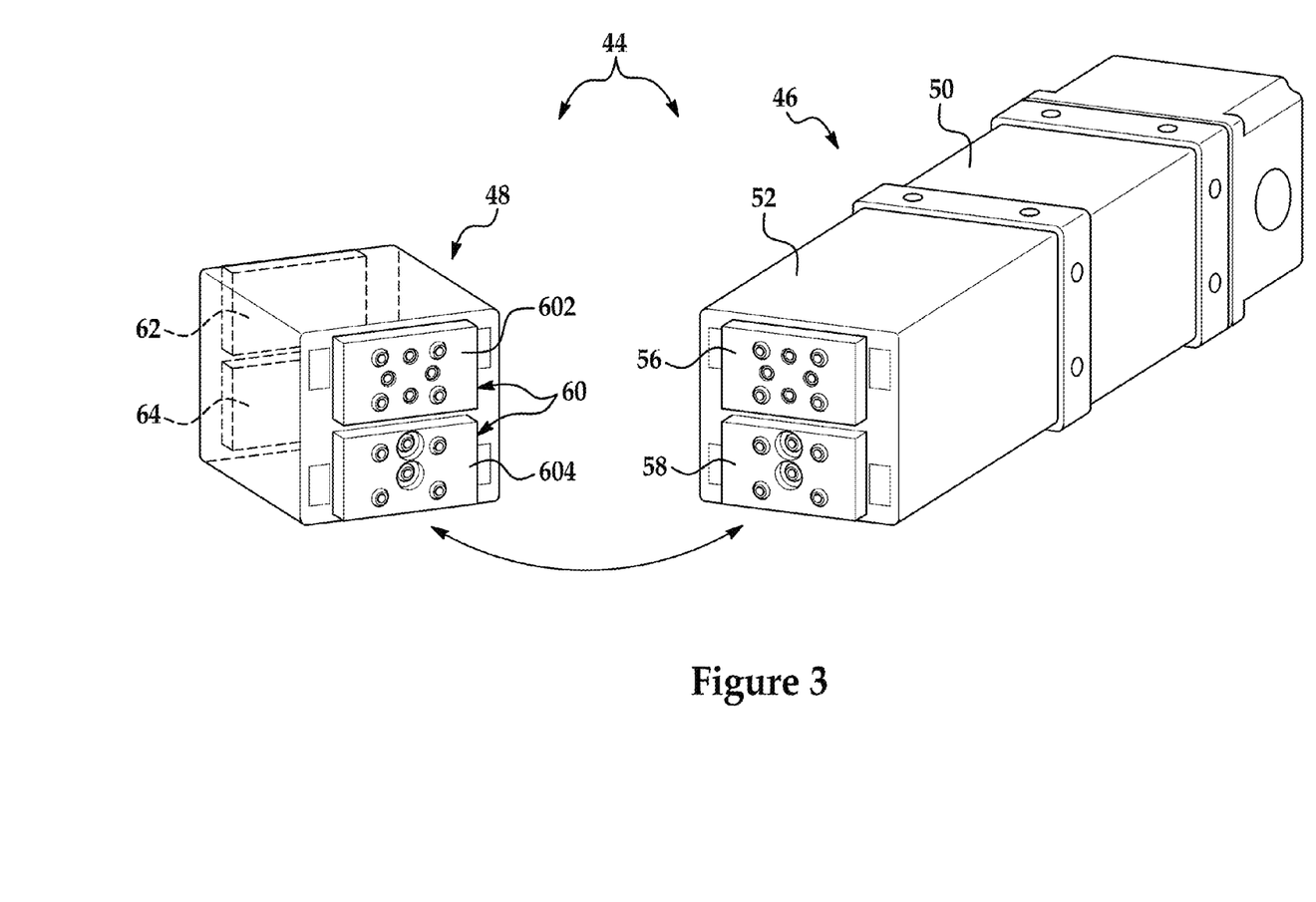
FIG. 3 is a generalized illustration of a DC power supply unit, which includes a DC power supply and a programmable polarity module, that can be carried by the welding gun shown in FIG. 1.

A DC power supply unit 44, as shown best in FIG. 3, is carried by the welding gun 10. The DC power supply unit 44 supplies a direct current for passage between the welding electrodes 30, 34 when they are pressed against the oppositely-facing surfaces 36, 38 of their respective metal workpieces 16, 18. This supplied DC is sufficient to initiate a weld pool at the faying interface 20 according to a defined weld schedule. Additionally, the DC power supply unit 44 allows the polarity designations of the first and second welding electrodes 30, 34 to be controlled. And it can perform these functions while remaining installed on the welding gun 10. The DC power supply unit 44 includes, as shown, a DC power supply 46 and a programmable polarity module 48.

The DC power supply 46 is configured to receive, for example, an input single-phase medium frequency (~1000 Hz) alternating current (AC) from a weld control (not shown), and to convert that input AC into a higher-amperage welding DC, typically between about 5 kA and about 65 kA, that is supplied to the welding gun 10. The DC power supply 46 may be any known type that is suitable for conducting resistance spot welding. For example, as shown in FIG. 3, the DC power supply 46 may be a water-cooled, medium-frequency DC power supply that includes, as an integrated package, a transformer 50 and a rectifier 52. This type of DC power supply is commercially available from a number of suppliers including ARO Welding Technologies (US headquarters in Chesterfield Township, Mich.) and Bosch Rexroth (US headquarters in Charlotte, N.C.). Other types of DC power supplies may of course be used, including those configured to receive a single-phase 60 Hz AC.

The transformer 50 receives the input AC at an input port 54. The input AC is fed through a primary winding and is "stepped down" to create a lower voltage, higher amperage secondary AC in a secondary winding. This secondary AC is then fed to the rectifier 52 where a collection of semiconductor diodes converts it into the welding DC. The rectifier 52 includes a fixed positive polarity output lug 56 and a fixed negative polarity output lug 58 that are composed of copper, a copper alloy, or some other highly electrically conductive material. These output lugs 56, 58 deliver the welding DC from the rectifier 52. Skilled artisans will know and understand the function and operation of the transformer 50 and the rectifier 52 and, as such, a more comprehensive description of these two components and their integration into a single package need not be provided here.

The programmable polarity module 48 is electrically connectable to the rectifier 52 of the DC power supply 46. Here, as shown in FIGS. 1 and 3, the programmable polarity module 48 includes a pair of fixed polarity input lugs 60. Each of these input lugs 60 is composed of copper, a copper alloy, or some other highly electrically conductive material. One of the input lugs 60 is electrically connectable to the positive polarity output lug 56 of the rectifier 52 and the other is electrically connectable to the negative polarity output lug 58 of the rectifier 52. When electrically connected, as is the case in FIG. 1, the input lugs 60 assume the polarity of whichever output lug 56, 58 they are associated with—i.e., the input lug 60 connected to the fixed positive polarity output lug 56 is afforded a positive polarity (designated positive lug 602) and the input lug 60 connected to the fixed negative polarity output lug 58 is afforded a negative polarity (designated negative lug 604). Bolting or any other suitable type of connection features may be used to physically fasten the programmable polarity module 48 and the DC power supply 46 together.

The programmable polarity module 48 is also electrically connectable to the welding gun 10 so that the welding DC can be delivered to the welding electrodes 30, 34. The programmable polarity module 48 may include a first interchangeable polarity output lug 62 and a second interchangeable polarity output lug 64 to facilitate such a connection. The first interchangeable polarity output lug 62 is electrically connectable to a first bus bar 66 and the second interchangeable polarity output lug 64 is electrically connectable to a second bus bar 68. The first and second bus bars 66, 68 are composed of copper, a copper alloy, or some other highly electrically conductive material, and are configured to electrically communicate with the first and second gun arms 24, 26 and ultimately the first and second welding electrodes 30, 34, respectively. Like before, bolting or any other suitable type of connection features may be used to physically fasten the programmable polarity module 48 and the welding gun 10 together.

The polarities of the first and second interchangeable polarity output lugs 62, 64 are not fixed; rather, they can be switched between positive or negative at any time in accordance with any conceivable welding plan. The ability to switch the polarity of the first and second interchangeable polarity output lugs 62, 64 ultimately permits the polarities of the first and second welding electrodes 30, 34 to be switched in a corresponding way. This is because the designated polarity of the first and second interchangeable polarity output lugs 62, 64 establishes a matching polarity of the first and second welding electrodes 30, 34. For instance, if the first interchangeable polarity output lug 62 is designated positive and, consequently, the second interchangeable polarity output lug 64 is designated negative, then the first and second welding electrodes 30, 34 will be designated positive and negative, respectively, until the polarities of the lugs 62, 64 are switched. And when the polarities of the output lugs 62, 64 are switched, the polarities of the welding electrodes 30, 34 will be switched as well in the same way.

Figure 4:
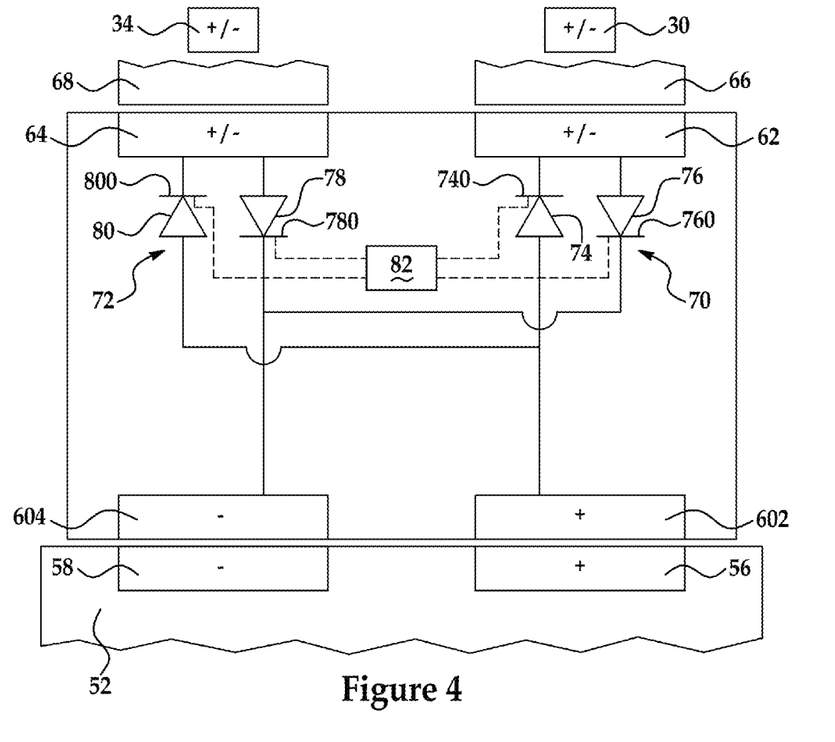
FIG. 4 is a schematic illustration of the programmable polarity module illustrated in FIG. 3.

A circuit design that may be incorporated into the programmable polarity module 48 to switch the polarities of the first and second interchangeable polarity output lugs 62, 64 is shown schematically in FIG. 4. As shown, a first pair 70 of SCR's (silicon controlled rectifiers) is associated with the first interchangeable polarity output lug 62 and a second pair 72 of SCR's is associated with the second interchangeable polarity output lug 64. The first pair 70 of SCR's includes a forward positive polarity SCR 74 and a reverse negative polarity SCR 76. Similarly, the second pair 72 of SCR's includes a forward negative polarity SCR 78 and a reverse positive polarity SCR 80. The forward positive polarity SCR 74 and the reverse positive polarity SCR 80 are associated with one of the fixed polarity input lugs 60, and the reverse negative polarity SCR 76 and the forward negative polarity SCR 78 are associated with the other input lug 60. It should be reiterated that, even though FIG. 4 shows the several SCR's 74, 76, 78, 80 as a single thyristor, each of the forward positive polarity SCR 74, the reverse negative polarity SCR 76, the forward negative polarity SCR 78, and the reverse positive polarity SCR 80 may also be an arrangement of one or more thyristors connected in parallel such that they act in tandem to achieve the same cumulative function as a single thyristor would, but with the added possibility of greater current capacity.

Each of the SCR's 74, 76, 78, 80 includes a gate 740, 760, 780, 800. These gates 740, 760, 780, 800 can be controlled to turn their respective SCR's 74, 76, 78, 80 "on" (gated)—which means current can flow through the SCR—or "off" (ungated)—which means current cannot flow through the SCR. Whether the SCR's 74, 76, 78, 80 are turned "on" or "off" depends on whether a voltage is applied to their gates 740, 760, 780, 800 that meets or exceeds a gate voltage, which is typically anywhere between about 1V-10V. To turn any of the SCR's 74, 76, 78, 80 "on," and to thus permit current flow, a voltage is applied to the relevant gate 740, 760, 780, 800 that is equal to or greater than the required gate voltage. To turn any of the SCR's 74, 76, 78, 80 "off," and to thus block current flow, no voltage (i.e., 0V) or a voltage that is less than the gate voltage is applied to the relevant gate 740, 760, 780, 800. A controller 82 may be incorporated into the circuit design to control which SCR's are turned "on" or "off" at any given time. The controller 82 may be a microcontroller of any known kind, and it may interface with the gates 740, 760, 780, 800 through conventional circuitry known to skilled artisans.

Two modes for turning the SCR's 74, 76, 78, 80 "on" and "off" are applicable here: a forward polarity mode and a reverse polarity mode. In the forward polarity mode, the forward positive polarity SCR 74 and the forward negative polarity SCR 78 are turned "on" while the reverse negative polarity SCR 76 and the reverse positive polarity SCR 80 are turned "off." This mode coordinates the positive input lug 602 with the first interchangeable polarity output lug 62 and the negative input lug 604 with the second interchangeable polarity output lug 64. Such coordination assigns a positive polarity to the first interchangeable polarity output lug 62 and a negative polarity to the second interchangeable polarity lug 64 within the context of the electrical circuit shown in FIG. 4.

The reverse polarity mode achieves the opposite effect at the interchangeable polarity output lugs 62, 64. Specifically, in the reverse polarity mode, the reverse negative polarity SCR 76 and the reverse positive polarity SCR 80 are turned "on" while the forward positive polarity SCR 74 and the forward negative polarity SCR 78 are turned "off." This mode coordinates the positive input lug 602 with the second interchangeable polarity output lug 64 and the negative input lug 604 with the first interchangeable polarity output lug 62. Such coordination assigns a positive polarity to the second interchangeable polarity output lug 64 and a negative polarity to the first interchangeable polarity output lug 62 within the context of the electrical circuit shown in FIG. 4. Table 1 below summarizes the forward polarity mode and the reverse polarity mode as just described.

TABLE 1

| Mode | Forward Positive Polarity SCR | Reverse Negative Polarity SCR | Forward Negative Polarity SCR | Reverse Positive Polarity SCR | Polarity of First Interchangeable Polarity Output Lug | Polarity of Second Interchangeable Output Polarity Lug |
|---|---|---|---|---|---|---|
| Forward Polarity Mode | ON | OFF | ON | OFF | POSITIVE | NEGATIVE |
| Reverse Polarity Mode | OFF | ON | OFF | ON | NEGATIVE | POSITIVE |

A resistance spot welding process that implements the programmable polarity module 48 will now be described with reference to FIGS. 1, 3, and 4. To begin, the metal workpiece stack-up 12 is located between the first and second welding electrodes 30, 34 so that the weld site 14 is generally aligned with the electrodes' 30, 34 opposed weld faces 42. The metal workpiece stack-up 12 may be brought to such a location, as is often the case when the gun arms 24, 26 are part of a stationary pedestal welder, or the gun arms 24, 26 may be robotically moved to locate the electrodes 30, 34 relative to the weld site 14 of the stack-up 12. Once the stack-up 12 is properly located, the first and second welding arms 24, 26 converge to press the weld faces 42 of the first and second welding electrodes 30, 34 against the oppositely-facing surfaces 36, 38 of the first and second metal workpieces at the weld site 14.

The welding DC supplied by the DC power supply unit 44 is then passed between the first and second welding electrodes 30, 34 and through the first and second metal workpieces 16, 18 and across the faying interface 20. Resistance to the concentrated flow of the welding DC through the metal workpieces 16, 18 and across the faying interface 20 generates heat at the faying interface 20 at the weld site 14. This heat initiates a molten weld pool at the faying interface 20 that penetrates into one or both of the workpiece 16, 18 depending on the composition and nature of the workpieces 16, 18. Upon stoppage of the welding DC current, the molten weld pool solidifies into the weld nugget 22. The first and second welding electrodes 30, 34 are then refracted from their engaged surfaces 36, 38 of the metal workpieces 16, 18. Next, the workpiece stack-up 12 is re-located between the first and second welding electrodes 30, 34 at a different weld site 14, or it is moved away so that another stack-up 12 can be located for spot welding. More spot welds are then formed in the same way.

The programmable polarity module 48 can designate the polarities of the first and second welding electrodes 30, 34 as needed to best suit the particular spot welding process being performed. The programmable polarity module 48 can assign a positive polarity to the first welding electrode 30 and a negative polarity to the second welding electrode 34, or vice versa, and can further switch the polarities of the first and second welding electrodes 30, 34 at any time. Such flexibility is made possible by controlling which of the SCR's 74, 76, 78, 80 are turned "on" and which are turned "off." Recall that in the forward polarity mode, for instance, the first interchangeable polarity output lug 62, and thus the first welding electrode 30, is assigned the positive polarity while the second interchangeable polarity output lug 64, and thus the second welding electrode 34, is assigned the negative polarity. The opposite is true in the reverse polarity mode, in which the first interchangeable polarity output lug 62, and thus the first welding electrode 30, is assigned the negative polarity while the second interchangeable polarity output lug 64, and thus the second welding electrode 34, is assigned the positive polarity.

The programmable polarity module 48 may be useful when spot welding an aluminum alloy workpiece to another aluminum alloy workpiece with a pair of copper alloy welding electrodes. The aluminum alloy workpieces could be, for example, a pair of aluminum alloy sheet metal layers, one of which is about 3.0 mm thick or less at the weld site 14. They could also be, as another example, a pair of aluminum alloy castings, one of which is about 3.0 mm thick or less at the weld site 14. It has been found that repeatedly forming spot welds between such aluminum alloy workpieces with a conventional spot welding set-up—in which one welding electrode has a fixed positive polarity and the other welding electrode has a fixed negative polarity—causes the positive welding electrode to wear at a faster rate than the negative welding electrode. The positive welding electrode may, in some instances, wear approximately twice as fast as the negative welding electrode over the course of forming 30-100 spot welds.

Figure 5:
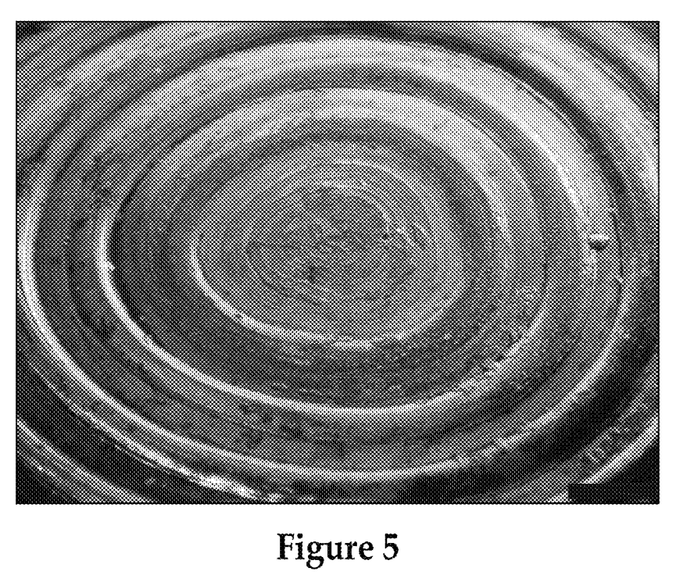
FIG. 5 is a picture of a welding electrode that has been provided with a negative polarity during repeated spot welding of an aluminum alloy sheet metal layer to another aluminum alloy sheet metal layer.
Figure 6:
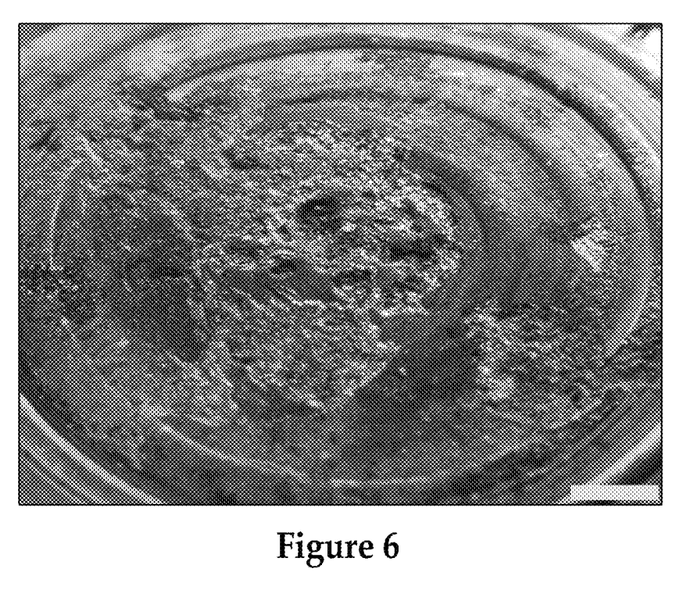
FIG. 6 is a picture of a welding electrode that has been provided with a positive polarity during repeated spot welding of an aluminum alloy sheet metal layer to another aluminum alloy sheet metal layer.

The wear experienced at the two welding electrodes 30, 34 is the accumulation of a hard metal reaction product on the weld face 42 that is derived from a metallurgical reaction between the aluminum alloy of the metal workpiece and the copper alloy of the welding electrode. The accumulation of this hard metal reaction product may eventually spill and form pits in the weld face 42. To visually demonstrate this wear mechanism, FIGS. 5 and 6 show photomicrographs of a fixed negative polarity copper alloy welding electrode and a fixed positive polarity copper alloy welding electrode, respectively, that have been used together to form 100 spot welds in a pair of overlapping 2 mm thick aluminum alloy sheet metal layers. The fixed positive polarity welding electrode (FIG. 6) has plainly experienced more aluminum alloy-copper alloy reaction product accumulation on its weld face. Because of this, the positive welding electrode needs to be periodically redressed to remove the hard metal reaction product, or replaced with a new welding electrode, more often than the negative welding electrode.

The programmable polarity module 48 can mitigate the above-described polarity bias by periodically switching the polarities of the first and second welding electrodes 30, 34. The polarities may be switched each time a certain number of spot welds have been performed. Preferably, the polarities of the first and second welding electrodes 30, 34 are switched after every 1-5 spot welds, and most preferably after every spot weld. For example, the programmable polarity module 48 may be operated in its forward polarity mode, in which the first welding electrode 30 is assigned the positive polarity and the second welding electrode 34 is assigned the negative polarity, and the welding DC may be supplied to form a first spot weld. Then, after the welding DC has stopped, the programmable polarity module 48 switches to its reverse polarity mode, in which the first welding electrode 30 is assigned the negative polarity and the second welding electrode 34 is assigned the positive polarity, and the welding DC may be supplied to form a second spot weld. The programmable polarity module 48 may then switch back to its forward polarity mode, and so on. This back-and-forth switching of the electrode polarities will even out the rates at which the two welding electrodes 30, 34 wear and, as a result, increase the amount of spot welds that can be formed with the two electrodes 30, 34 relative to the conventional fixed electrode polarity spot welding technique.

The programmable polarity module 48 may also be useful when the spot welding of an aluminum alloy workpiece and a metal workpiece would create a heat imbalance in the workpieces that degrades weldability. For example, an aluminum alloy sheet metal layer and a steel sheet metal layer have different physical characteristics (e.g., melting points, thermal conductivities, hardness, etc.), and when trying to spot weld the two sheet metal layers together with a pair of copper alloy electrodes, a heat imbalance develops as current passes through them. In this case, a greater amount of localized heat is generated in the more electrically resistive steel than the less electrically resistive aluminum alloy. A heat imbalance may also develop when trying to spot weld different types of aluminum alloy workpieces—such as an aluminum alloy sheet metal layer and an aluminum alloy casting—with a pair of copper alloy electrodes. This is because an aluminum alloy casting typically has a higher electrical resistivity than an aluminum alloy sheet metal layer.

The spot welding of such workpieces, like before, creates a heat imbalance at the electrode/workpiece interfaces in which more heat is generated at the positive welding electrode and less heat is generated at the negative welding electrode. It has been found that the weld quality between the metal workpieces can be affected by controlling the electrode polarities and, by extension, the heat imbalance developed at the welding electrodes 30, 34. When spot welding an aluminum alloy sheet metal layer and a steel sheet metal layer, for instance, the ability to switch the polarities of the welding electrodes 30, 34 allows for the electrode heat imbalance to be used to compensate for the lower electrical resistivity and the lower melting point of the aluminum alloy sheet metal layer. Either the positive welding electrode or the negative welding electrode may engage the aluminum alloy sheet metal layer to generate more or less heat, respectively, so as to obtain better weld nugget penetration, preferably approaching 50%, into the aluminum alloy sheet metal layer. When spot welding an aluminum alloy sheet metal layer to an aluminum alloy casting, the differences in electrical resistivities can usually be counteracted by engaging the more electrically resistive aluminum alloy casting with the negative welding electrode, which experiences less heat generation at the electrode/workpiece interface compared to the positive welding electrode.

Figure 7:
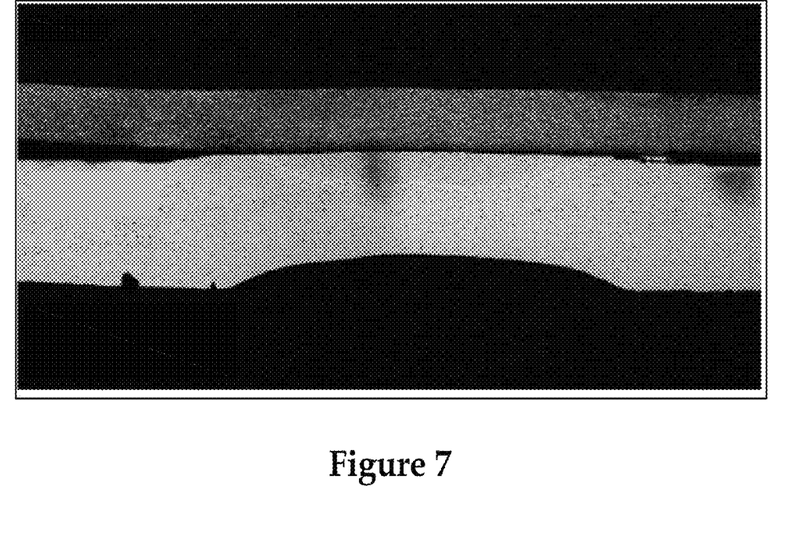
FIG. 7 is a cross-sectional photomicrograph of a resistance spot weld formed between an aluminum alloy sheet metal layer and a steel sheet metal layer in which the welding electrode that engaged the aluminum alloy sheet metal layer had the negative polarity.
Figure 8:
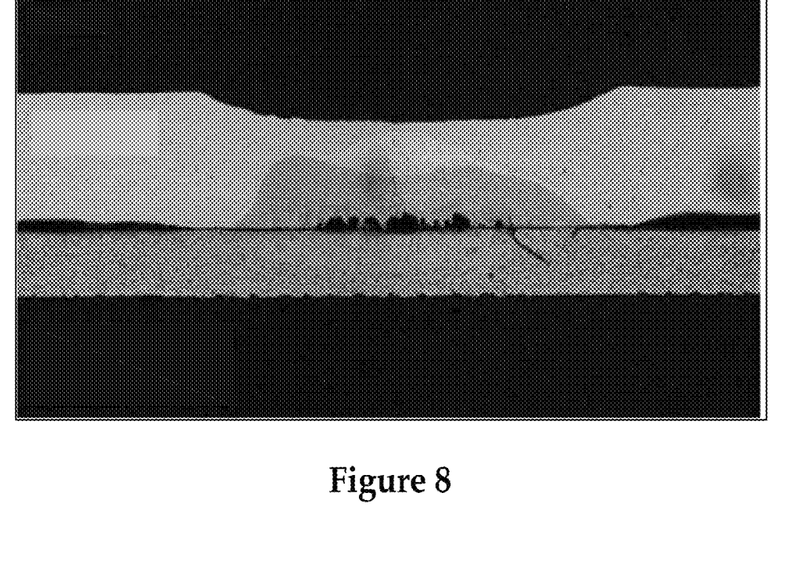
FIG. 8 is a cross-sectional photomicrograph of a resistance spot weld formed between an aluminum alloy sheet metal layer and a steel sheet metal layer in which the welding electrode that engaged the aluminum alloy sheet metal layer had the positive polarity.

FIGS. 7-10 visually demonstrate the effects that electrode polarity can have on weld quality. FIGS. 7 and 8 are cross-sectional photomicrographs of a 1 mm thick aluminum alloy sheet metal layer and a 0.55 mm thick steel sheet metal layer that have been subjected to spot welding. FIG. 7 shows the effect of engaging the aluminum alloy sheet metal layer (bottom layer) with a copper alloy welding electrode that has been assigned the negative polarity and engaging the steel sheet metal layer (top layer) with a copper alloy welding electrode that has been assigned the positive polarity. Conversely, FIG. 8 shows the effect of engaging the aluminum alloy sheet metal layer (top layer) with a copper alloy welding electrode that has been assigned the positive polarity and engaging the steel sheet metal layer (bottom layer) with a copper alloy welding electrode that has been assigned the negative polarity. As can be seen, in this particular example, engaging the aluminum alloy sheet metal layer with the positive polarity welding electrode (FIG. 8) results in deeper weld penetration.

Figure 9:
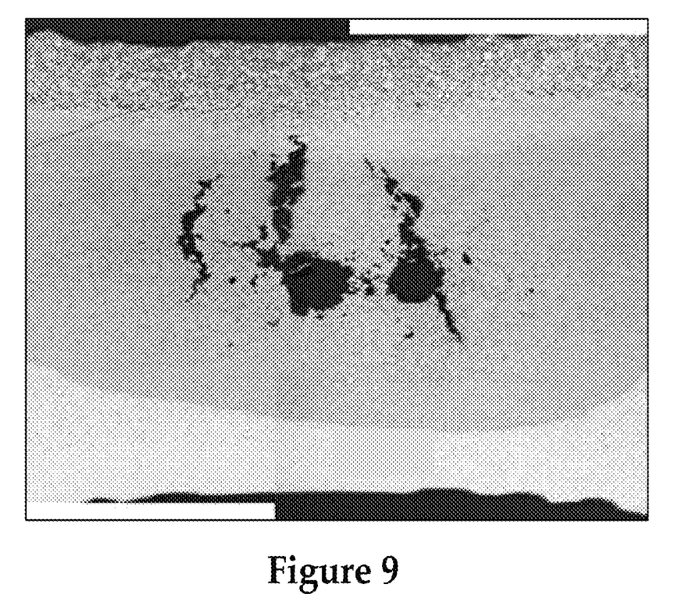
FIG. 9 is a cross-sectional photomicrograph of a resistance spot weld formed between an aluminum alloy sheet metal layer and an aluminum alloy casting in which the welding electrode that engaged the aluminum alloy casting had the negative polarity.
Figure 10:
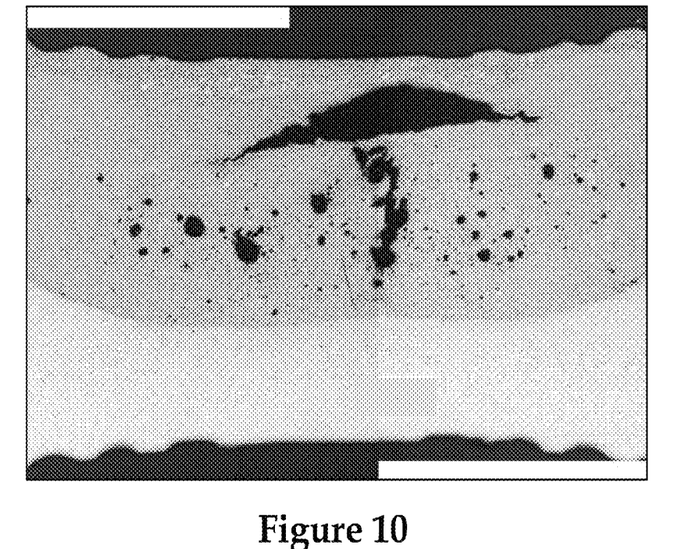
FIG. 10 is a cross-sectional photomicrograph of a resistance spot weld formed between an aluminum alloy sheet metal layer and an aluminum alloy casting in which the welding electrode that engaged the aluminum alloy casting had the positive polarity.

FIGS. 9 and 10 are cross-sectional photomicrographs of a 2.5 mm thick aluminum alloy sheet metal layer and a 3 mm thick aluminum alloy casting that have been subjected to spot welding. FIG. 9 shows the effect of engaging the aluminum alloy casting (top layer) with a copper alloy welding electrode that has been assigned the negative polarity and engaging the aluminum alloy sheet metal layer (bottom layer) with a copper alloy welding electrode that has been assigned the positive polarity. Conversely, FIG. 10 shows the effect of engaging the aluminum alloy casting (top layer) with a copper alloy welding electrode that has been assigned the positive polarity and engaging the aluminum alloy sheet metal layer (bottom layer) with a copper alloy welding electrode that has been assigned the negative polarity. Here, it can be seen that a better-quality spot weld was produced when the negative polarity welding electrode, which generates less heat at its workpiece/electrode interface, engaged the more electrically resistive aluminum alloy casting (FIG. 9), as demonstrated by the absence of the large triangular-shaped void formed below the interface of the casting (upper layer) and the welding electrode that can be seen in FIG. 10.

The programmable polarity module 48 can accommodate the above-described polarity bias by switching the polarities of the welding electrodes 30, 34, as needed, to achieve or maintain good weld quality. For instance, when spot welding a metal stack-up 12 that includes an aluminum alloy sheet metal layer and a steel sheet metal layer, the polarity assignments of the two welding electrodes 30, 34 will depend on the properties of stack-up 12 and the weld schedule, meaning that the aluminum alloy sheet metal layer could be engaged by either the positive welding electrode or the negative welding electrode depending on the circumstances. If the first and second welding electrodes 30, 34 are desired to be assigned the positive and negative polarities, respectively, then the programmable polarity module 48 would be operated in its forward polarity mode. If the opposite polarity designations are desired, however, then programmable polarity module 48 would be operated in its reverse polarity mode. Regarding the practice of spot welding a metal stack-up 12 that includes an aluminum alloy sheet metal layer and an aluminum alloy casting, the programmable polarity module 48 could be operated, in many instances, in whichever mode assigns the positive polarity to the welding electrode 30, 34 that engages the aluminum alloy sheet metal layer.

The above description of preferred exemplary embodiments is merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A programmable polarity module that is electrically connectable to both a direct current power supply and to a welding gun that carries a first welding electrode and a second welding electrode, the programmable polarity module comprising;
   a fixed positive polarity input lug and a fixed negative polarity input lug that, respectively, are configured to electrically connect to a fixed positive polarity output lug and a fixed negative polarity output lug of a direct current power supply;
   a first interchangeable polarity output lug and a second interchangeable polarity output lug that are configured to electrically connect to a welding gun that carries a first welding electrode and a second welding electrode;
   a first pair of silicon controlled rectifiers (SCR's) associated with the first interchangeable polarity output lug, the first pair of SCR's including a forward positive SCR, which is also associated with the fixed positive polarity input lug, and a reverse negative SCR, which is also associated with the fixed negative polarity input lug;
   a second pair of SCR's associated with the second interchangeable polarity output lug, the second pair of SCRs including a forward negative SCR, which is also associated with the fixed negative polarity input lug, and a reverse positive SCR, which is also associated with the fixed positive polarity input lug; and
   a controller that controls the first and second pairs of SCR's to assign either a positive or negative polarity to the first interchangeable polarity output lug and either a positive or negative polarity to the second interchangeable polarity output lug, the polarities of the first and second interchangeable output lugs being opposite of each other.

2. The programmable polarity module set forth in claim 1, wherein the controller assigns a positive polarity to the first interchangeable polarity output lug and a negative polarity to the second interchangeable polarity output lug by operating the first and second pairs of SCR's in a forward polarity mode in which the forward positive SCR and the forward negative SCR are gated and the reverse negative SCR and the reverse positive SCR are ungated.

3. The programmable polarity module set forth in claim 1, wherein the controller assigns a negative polarity to the first interchangeable polarity output lug and a positive polarity to the second interchangeable polarity output lug by operating the first and second pairs of SCR's in a reverse polarity mode in which the reverse negative SCR and the reverse positive SCR are gated and the forward positive SCR and the forward negative SCR are ungated.

4. The programmable polarity module set forth in claim 1, wherein each of the forward positive SCR, the reverse negative SCR, the forward negative SCR, and the reverse positive SCR includes a gate that prevents current from flowing through its respective SCR unless a voltage is applied to the gate that meets or exceeds a gate voltage.

5. The programmable polarity module set forth in claim 1, wherein each of the fixed positive polarity input lug, the fixed negative polarity input lug, the first interchangeable polarity output lug, and the second interchangeable polarity output lug is formed of a copper alloy.

6. A direct current power supply unit for a welding gun configured to practice resistance spot welding, the power supply unit comprising:
a direct current power supply that includes a transformer and a rectifier, the rectifier receiving an AC current from the transformer and converting the AC current to a DC current, the rectifier being electrically coupled to a fixed positive polarity output lug and a fixed negative polarity output lug;
a programmable polarity module that is electrically connected to the direct current power supply, the programmable polarity module comprising a fixed positive polarity input lug that is electrically connected to the fixed positive polarity output lug of the direct current power supply and a fixed negative polarity input lug that is electrically connected to the fixed negative polarity output lug of the direct current power supply, the programmable polarity module further comprising a first interchangeable polarity output lug and a second interchangeable polarity output lug that are electrically connectable to a first welding electrode and a second welding electrode, respectively, of a welding gun, the first interchangeable polarity output lug being assigned a polarity, either positive or negative, and the second interchangeable polarity output lug being assigned a polarity opposite that of the first interchangeable polarity output lug when a direct welding current is being supplied to the module by the direct current power supply, and wherein the programmable polarity module is operable to switch the polarities of the first interchangeable polarity output lug and the second interchangeable polarity output lug without being electrically disconnected from the direct current power supply.

7. The direct current power supply unit set forth in claim 6, wherein the programmable polarity module further comprises:
a first pair of silicon controlled rectifiers (SCR's) associated with the first interchangeable polarity output lug, the first pair of SCR's including a forward positive SCR, which is also associated with the fixed positive polarity, and a reverse negative SCR, which is also associated with the fixed negative polarity input lug; and
a second pair of SCR's associated with the second interchangeable polarity output lug, the second pair of SCRs including a forward negative SCR, which is also associated with the fixed negative polarity input lug, and a reverse positive SCR, which is also associated with the fixed positive polarity input lug; and
a controller that controls the first and second pairs of SCR's to assign either a positive or negative polarity to the first interchangeable polarity output lug and either a positive or negative polarity to the second interchangeable polarity output lug, the polarities of the first and second interchangeable output lugs being opposite of each other.

8. The direct current power supply unit set forth in claim 7, wherein the controller assigns a positive polarity to the first interchangeable polarity output lug and a negative polarity to the second interchangeable polarity output lug by operating the first and second pairs of SCR's in a forward polarity mode in which the forward positive SCR and the forward negative SCR are gated and the reverse negative SCR and the reverse positive SCR are ungated.

9. The direct current power supply unit set forth in claim 7, wherein the controller assigns a negative polarity to the first interchangeable polarity output lug and a positive polarity to the second interchangeable polarity output lug by operating the first and second pairs of SCR's in a reverse polarity mode in which the reverse negative SCR and the reverse positive SCR are gated and the forward positive SCR and the forward negative SCR are ungated.

10. The direct current power supply unit set forth in claim 7, wherein each of the forward positive SCR, the reverse negative SCR, the forward negative SCR, and the reverse positive SCR includes a gate that prevents current from flowing through its respective SCR unless a voltage is applied to the gate that meets or exceeds a gate voltage.

11. The direct current power supply unit set forth in claim 6, wherein the transformer receives an input alternating current and creates, from that input alternating current, a secondary alternating current that has a lower voltage and a higher amperage than the input alternating current, and the rectifier comprises a collection of semiconductor diodes that convert the secondary alternating current received from the transformer into the direct welding current for delivery to the programmable polarity module, the welding current being delivered to the programmable polarity module by way of the fixed positive polarity output lug and the fixed negative polarity output lug, which are included on the rectifier, and the fixed positive polarity input lug and the fixed negative polarity input lug of the module.

12. The direct current power supply unit set forth in claim 6, wherein the programmable polarity module delivers the direct welding current, which ranges from about 5 kA to about 65 kA, to the welding gun for passage between the first and second welding electrodes.

13. The direct current power supply unit set forth in claim 6, wherein each of the fixed positive polarity output lug and the fixed negative polarity output lug of the direct current power supply, the fixed positive polarity input lug and the fixed negative polarity input lug of the programmable polarity module, and the first interchangeable polarity output lug and the second interchangeable polarity output lug of the programmable polarity module is comprised of a copper alloy.

* * * * *